C. TORCHEBEUF & E. DE LANNEAU.
CARBURETING LAMP.
APPLICATION FILED JUNE 7, 1909.
958,045.
Patented May 17, 1910.
Fig. 1.
Fig. 2.
Fig. 3.
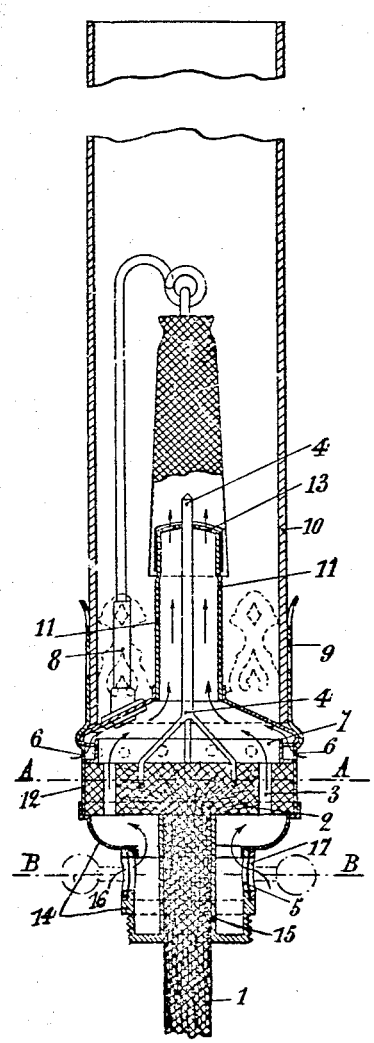
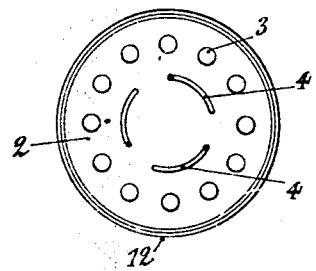
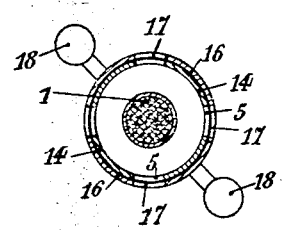
Witnesses:
Ivan Josephs.
M. Brady.
Inventors:
Charles Torchebeuf
Edgard De Lanneau
by  
their Attorney

UNITED STATES PATENT OFFICE.

CHARLES TORCHEBEUF AND EDGARD DE LANNEAU, OF PARIS, FRANCE.

CARBURETING-LAMP.

958,045.

Specification of Letters Patent. Patented May 17, 1910.

Application filed June 7, 1909. Serial No. 500,589.

*To all whom it may concern:*

Be it known that we, CHARLES TORCHEBEUF and EDGARD DE LANNEAU, citizens of the Republic of France, residing, respectively, at 77 Boulevard Exelmans and 36 Rue de Moscou, Paris, France, have invented new and useful Improvements in Carbureting-Lamps, of which the following is a specification.

The present invention has for its object an incandescent burner fed with air carbureted by means of volatile products such as ordinary carbureting liquid or hydrocarbons.

The invention is illustrated in the annexed drawing in which:—

Figure 1 is a longitudinal section of the contrivance showing the essential elements and particularly the novel features of the burner. Fig. 2 is a section along the line A—A of Fig. 1, and Fig. 3 is a section along the line B—B of Fig. 1.

The characteristic feature of this burner is that it comprises for feeding purposes an absorbent mass 2 of incombustible matter, such as flexible asbestos for example, continuously moistened with the carbureting liquid by a wick 1 of incombustible material, the upper part of which is incorporated with the said mass. This latter, which is preferably molded into the form of a disk or short cylinder is pierced with a plurality of holes 3 for the passage of the air to be carbureted. The absorbent mass 2 is inclosed within a case 12 which preferably is a good conductor of heat, the case being situated immediately beneath the mixing chamber 11 in such a manner as to be heated as directly as possible by the heat given out by the flame. The heating of the absorbent mass is in addition greatly facilitated by a body 4 which is a good conductor of heat and which is situated at the axis of the mixing chamber with its lower end, which is branched, inserted into the said absorbent mass, while its upper end projects above the metallic cover 13 of the chamber. In the form of construction shown, the conductive body consists of a metallic rod 4 or a plurality of wires suitably bent at their lower ends and united to form a single vertical rod as shown in the drawing.

The case 12 which may be integral with 11 which serves as the combustion and the mixing chamber, is carried on a suitable base 14 of which the lower part is screw-threaded to allow of the burner being secured to a reservoir of combustible liquid into which the wick 1 dips. A guide tube 15 incloses the wick and centers it in the base 14. In the wall of the latter, above the screw-threaded portion, are situated openings 5 the size of which can be regulated by means of a ring 16 provided with corresponding openings 17. This outer ring can be replaced by means of two rods 18 secured thereto.

Within the case 12, above the molded absorbent mass 2, are formed a series of orifices 6 of variable number and size according to the type of burner employed. On a level with these orifices there is fitted within the case 12 a flanged washer 7 serving on the one hand to maintain the mass 2 securely fixed within the base, and on the other hand to prevent the outside air from finding direct entrance through the orifices 6, thus facilitating the obtainment of a steady light.

The base of the mixing chamber preferably comprises a truncated conical portion to which is secured the support 8 of the suspension rod of the mantle.

The new burner, as in the majority of known burners, comprises a gallery 9 which serves to carry the chimney 10.

The wick 1 and the flat cylinder 2 being impregnated with the carbureting liquid, and the orifices 5 being fully open, the ignition will be effected by introducing into the chimney from above or below, a match or a pad saturated with alcohol. The draft which will result will draw in the air which, passing through the orifices 5, will be carbureted in traversing the orifices 3 of the mass 2. The external air will also enter through the orifices 6 and rise directly to the mantle without passing through the orifices 3. These orifices, whose size is invariable, lessen the proportion of carbureted air entering through the orifices 5, and produce a mixture of carbureted air which burns with a blue flame. The rod 4 will be raised to a high temperature, and by conduction will transmit to the vaporizer 2, heat sufficient to vaporize the combustible liquid contained therein. The walls of the case 12 formed by the base of the burner tube, will also convey heat to the vaporizer, and this heat will be added to that of the rod. The carburization of the air thus occurs at a temperature high enough to be independent of outside influence. To extinguish the light it is only necessary to close the openings completely, and to leave them in this position in order to avoid evaporation of the combustible liquid.

We claim:

1. In a carbureting lamp, the combination with a mass of absorbent material, adapted for the carburization of air, of means for heating said mass, said means comprising a rod having one end arranged in proximity to the flame and its opposite end branched and extending into the mass of absorbent material, substantially as described.

2. In a carbureting lamp, the combination with a base provided with air admission openings, of a case carried by said base, a mass of pierced absorbent material inclosed within the case and designed to carburet air entering through the openings in the base, said case being provided with air admission openings above the mass of absorbent material, baffles adjacent the last mentioned openings for deflecting the entering air from the absorbent mass, and a rod having one end in proximity to the flame and having its other end branched and embedded in the absorbent mass, substantially as described.

In testimony whereof we have signed our names to this specification in the presence of two subscribing witnesses.

CH. TORCHEBEUF.
E. DE LANNEAU.

Witnesses:
LOUIS FAUTRA,
DEAN B. MASON.